United States Patent
Peng

(10) Patent No.: US 11,425,728 B2
(45) Date of Patent: Aug. 23, 2022

(54) DOWNLINK CONTROL INFORMATION TRANSMISSION METHOD, DEVICE AND NETWORK EQUIPMENT

(71) Applicant: VIVO MOBILE COMMUNICATION CO., LTD., Guangdong (CN)

(72) Inventor: Shuyan Peng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 42 days.

(21) Appl. No.: 16/969,227

(22) PCT Filed: Jan. 29, 2019

(86) PCT No.: PCT/CN2019/073671
§ 371 (c)(1),
(2) Date: Aug. 12, 2020

(87) PCT Pub. No.: WO2019/154185
PCT Pub. Date: Aug. 15, 2019

(65) Prior Publication Data
US 2021/0007107 A1    Jan. 7, 2021

(30) Foreign Application Priority Data
Feb. 12, 2018   (CN) .......................... 201810147628.2

(51) Int. Cl.
*H04W 72/04* (2009.01)
*H04L 1/00* (2006.01)
(Continued)

(52) U.S. Cl.
CPC ....... *H04W 72/0493* (2013.01); *H04L 1/0004* (2013.01); *H04L 1/1819* (2013.01);
(Continued)

(58) Field of Classification Search
CPC .......... H04W 72/0493; H04W 72/042; H04W 72/0446; H04L 1/0004; H04L 1/1819; H04L 27/2605; H04L 5/0007
See application file for complete search history.

(56) References Cited

U.S. PATENT DOCUMENTS 9,392,595 B2   7/2016  Guan et al.
2010/0074195 A1*  3/2010  Cheng ................... H04L 1/0026
                                                   370/329
(Continued)

FOREIGN PATENT DOCUMENTS

CN      102124693 A     7/2011
CN      102724757 A    10/2012
(Continued)

OTHER PUBLICATIONS

First Office Action received from the State IP office of Republic of China for Application No. 201810147628.2, dated Apr. 29, 2021, 7 Pages and 6 pages of translation.
(Continued)

*Primary Examiner* — Samina F Choudhry
(74) *Attorney, Agent, or Firm* — Brooks Kushman P.C.

(57) ABSTRACT

The present disclosure discloses a downlink control information (DCI) transmission method, a device and a network equipment, wherein the method includes: determining a DCI format for transmitting the downlink control information (DCI), the DCI format comprising: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of
(Continued)

an aggregate transmission indication; and transmitting the DCI according to the DCI format.

18 Claims, 8 Drawing Sheets

(51) Int. Cl.
*H04L 1/18* (2006.01)
*H04L 27/26* (2006.01)
*H04L 5/00* (2006.01)

(52) U.S. Cl.
CPC ....... *H04L 27/2605* (2013.01); *H04W 72/042* (2013.01); *H04W 72/0446* (2013.01); *H04L 5/0007* (2013.01)

(56) References Cited

U.S. PATENT DOCUMENTS

| | | | |
|---|---|---|---|
| 2014/0161088 A1* | 6/2014 | Seo | H04L 5/0044 370/329 |
| 2014/0177547 A1 | 6/2014 | Guo et al. | |
| 2014/0307692 A1 | 10/2014 | Hong | |
| 2015/0003349 A1* | 1/2015 | Kim | H04W 72/042 370/329 |
| 2016/0088594 A1 | 3/2016 | Xiong et al. | |
| 2018/0278390 A1 | 9/2018 | Yakada et al. | |
| 2020/0022078 A1* | 1/2020 | Papasakellariou | H04W 72/0446 |
| 2020/0128542 A1 | 4/2020 | Tang et al. | |
| 2020/0374967 A1* | 11/2020 | Nogami | H04W 80/08 |

FOREIGN PATENT DOCUMENTS

| | | |
|---|---|---|
| CN | 106664517 A | 5/2017 |
| CN | 107294897 A | 10/2017 |
| CN | 107371272 A | 11/2017 |
| JP | 2017228813 A | 12/2017 |
| WO | 2017196968 A1 | 11/2017 |
| WO | 2018064613 A1 | 4/2018 |
| WO | 2018195965 A1 | 11/2018 |

OTHER PUBLICATIONS

Notice received from European Patent Office for Application No. WO2017KR047022017502, dated Nov. 9, 2017, 43 pages and 26 Pages of Translation.
R1-1801012, Document for discussion and decision, Jan. 22-26, 2018 , 12 pages.
International Preliminary Report on Patentability dated Aug. 27, 2020 issued in PCT/CN2019/073671.
Chinese 2nd Office Action, dated Sep. 3, 2021, issued in CN201810147628.2.
Japanese Office Action, dated Sep. 17, 2021 issued in JP2020564997.
Korean Office Action, dated Oct. 25, 2021, issued in KR1020207024303.
3GPP TSG RAN WG1 Meeting AH 1801 R1-1800278; Spreadtrum Communications;Jan. 22-26, 2018.
3GPP TSG RAN WGI Meeting AH 1801 RI-1801275, Qualcomm Incorporated; Jan. 22-26, 2018.
NTT DOCOMO, and the INC. (Rapporteur), R2-1800217, RAN WG's progress on NR WI in the November meeting 2017, 3GPP TSG RAN WG2 #AHS, Jan. 22-26, 2018.
Decision of Refusal for Japanese Patent Application No. 2020-564997 dated Jan. 25, 2022, 7 Pages including translation.
Examination Report for IN Application No. IN202027038259 dated Nov. 25, 2021, 6 Pages.

\* cited by examiner

```
determining a DCI format for transmitting the downlink
control information (DCI), the DCI format including: a time
domain resource allocation field, an aggregation transmission
  indication field, a first indication field or a second indication         11
     field, the first indication field indicating a configuration
   value of a time domain resource and a configuration value of
    a modulation order, the second indication field indicating
        a configuration value of a time domain resource and
    a configuration value of an aggregate transmission indication
```

```
                                                                            12
          transmitting the DCI using the DCI format
```

Fig. 1

```
determining a DCI format for transmitting the downlink control
  information (DCI), the DCI format including: a first indication
      field, the first indication field indicating a configuration
   value of a time domain resource and a configuration value of
   a modulation order, the configuration value of the time domain
     resource indicated by the first indication field including:         21
     a number of OFDM symbols indicated by a time domain
 resource field; the configuration value of the modulation order
  indicated by the first indication field including: the modulation
    order determined according to the number of the OFDM
        symbols indicated by the time domain resource field
```

```
                                                                            22
          transmitting the DCI using the DCI format
```

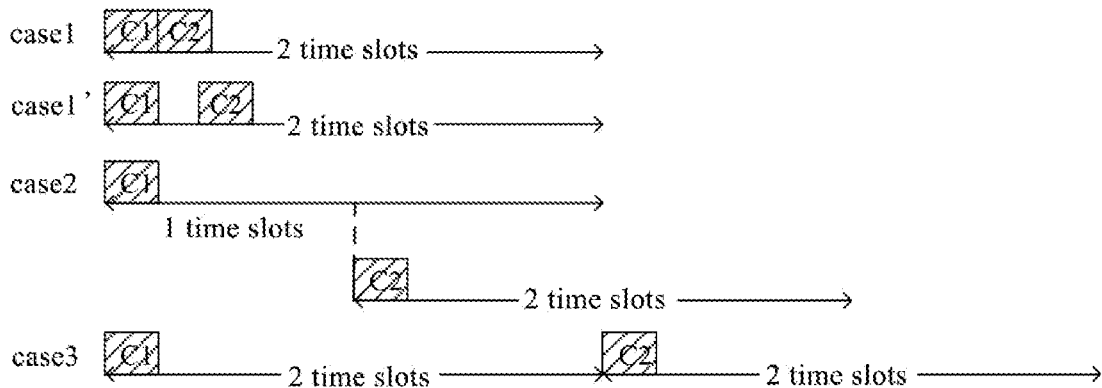

Fig. 7

```
determining a DCI format for transmitting the downlink
control information (DCI), the DCI format including a time
domain resource allocation field and an aggregation           ─ 81
transmission indication field; or the DCI format including
a second indication field, the second indication field indicating
a configuration value of a time domain resource and
a configuration value of an aggregate transmission indication
```

```
transmitting the DCI using the DCI format                     ─ 82
```

Fig. 8

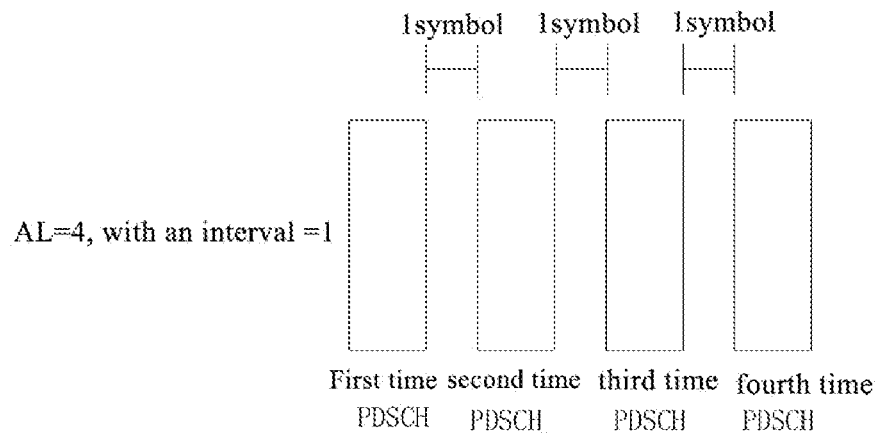

Fig. 11 determining a DCI format for transmitting the downlink control information (DCI), the DCI format including a time domain resource allocation field and an aggregation transmission indication field; or the DCI format including a second indication field, the second indication field indicating a configuration value of a time domain resource and a configuration value of an aggregate transmission indication; the DCI format further including at least one of: a DCI format identifier field, a frequency domain resource allocation field, a virtual resource block (VRB)-to-physical resource block (PRB) mapping field, a modulation and coding scheme field, a new data indication field, a redundancy version field, a hybrid automatic resending request (HARQ) process number indication field, a downlink allocation index indication field, a physical uplink control channel (PUCCH) transmission power control (TPC) indication field, a PUCCH resource indication field, a physical downlink sharing channel (PDSCH)-to-HARQ feedback time indication field, and a cyclic redundancy check field — 121 transmitting the DCI using the DCI format — 122

Fig. 12

DOWNLINK CONTROL INFORMATION TRANSMISSION METHOD, DEVICE AND NETWORK EQUIPMENT

CROSS-REFERENCE TO RELATED APPLICATION

This application is the U.S. national phase of PCT Application No. PCT/CN2019/073671 filed on Jan. 29, 2019, which claims priority to Chinese Patent Application No. 201810147628.2 filed on Feb. 12, 2018, the disclosures of which are incorporated in their entirety by reference herein.

TECHNICAL FIELD

The present disclosure relates to the field of communications technology, and in particular to a downlink control information (DCI) transmission method, a device and a network equipment.

BACKGROUND

In the new radio (New Radio, NR) system, broadcast message can be divided into master information block (master information block, MIB), remaining minimum system information (remaining minimum system information, RMSI) and other system information (other system information, OSI) and paging (paging) information;

the MIB is transmitted in a physical broadcast channel (physical broadcast channel, PBCH);

the RMSI and the OSI are transmitted in a physical downlink shared channel (physical downlink shared channel, PDSCH) and are scheduled by corresponding physical downlink control channel (physical downlink control channel, PDCCH); paging information can be divided into two types: one is directly indicated in the physical downlink control channel (physical downlink control channel, PDCCH), the other is transmitted by a physical downlink shared channel (physical downlink shared channel, PDSCH) scheduled by the physical downlink control channel (physical downlink control channel, PDCCH).

The MIB, RMSI, OSI, and paging are all broadcast message, and the coverage of a cell is the intersection of the coverages of MIB, SI, paging, and SI/paging PDCCH.

In the NR system, the payload of the MIB is 56 bits, and the symbol number of NR PBCH is 576 resource elements (resource elements, REs), where DMRS accounts for ¼, so 576*(1−¼)=432 REs are used for transmitting data. The PBCH uses QPSK coding, and the PBCH contains only MIB information therein. Therefore, the number of the coded bits of the MIB can reach 432*2=864 bits, the code rate is 56/864=0.065, and the MIB can be transmitted 4 times, and merged at the UE.

In the NR system, DCI format 1_0 (downlink fallback DCI) can be used in the related art to schedule the RMSI/OSI/paging information.

The payload of DCI format 1_0 is about 64 bits, the aggregation level (aggregation level, AL) that PDCCH can adopt is 4, 8, 16; at different aggregation levels, minus ¼ of the number of DMRS symbols, the number of available REs is as follows:

| AL | RE number | Coded bits (bits) | Code rate |
|---|---|---|---|
| 4 | 216 | 432 | 0.148 |
| 8 | 432 | 864 | 0.074 |

-continued

| AL | RE number | Coded bits (bits) | Code rate |
|---|---|---|---|
| 16 | 864 | 1728 | 0.052 |

A Control Channel Element (Control Channel Element, CCE) contains 6 RE groups (REGs), an REG contains 12REs;

when AL=4, the available REs are 4*6*12*(1−¼)=216 REs.

Frequency domain resources of control resource set (Control-resource Set, CORESET) of the RMSI are 24 RBs, 48 RBs, 96 RBs; where RB is a resource block;

The RMSI CORESET configures the bandwidth of the initial BWP, which is equal to the bandwidth of the RMSI CORESET.

Therefore, the initial bandwidth part (initial BWP) has 24 RBs, 48 RBs, 96RBs depending on the configuration. In a case of mini-slot scheduling, the number of symbols that can be occupied is 2/4/7 OFDM symbols, the SI/paging is transmitted by a single port, and the Demodulation Reference Signal (Demodulation Reference Signal, DMRS) configuration (configuration) type2 is adopted, then DMRS occupies ⅓ of the RE resources of the first OFDM symbol, and the available resources are as follows:

| Max REs | 24 RBs | 48 RBs | 96 RBs |
|---|---|---|---|
| 2 OFDM symbols | 480 | 960 | 1920 |
| 4 OFDM symbols | 1056 | 2112 | 4224 |
| 7 OFDM symbols | 1920 | 3840 | 7680 |

If 2 OFDM symbols and 24 RBs are used for transmission, the available REs can be calculated as: 2*12*24−1*12*24*⅓=432 REs.

When scheduling SI/paging using DCI format 1_0, if the aggregation level is 4 or 8, the code rate is too large (compared to MIB, the code rate for the MIB is 0.065), the PDCCH may not reach the coverage of the MIB.

In the LTE, the SI and paging are modulated by using QPSK fixedly.

In the NR system, DCI format 0_0/1_0 is used to schedule data in Ultra Reliable & Low Latency Communication (Ultra Reliable & Low Latency Communication, URLLC) scenarios, which has a higher code rate, resulting in a smaller PDCCH coverage.

SUMMARY

The embodiments of the present disclosure provide a downlink control information (DCI) transmission method, a device and a network equipment to solve the problem of high code rate of the PDCCH and insufficient coverage in the DCI transmission in the related art.

In a first aspect, an embodiment of the present disclosure provides a downlink control information (DCI) transmission method applied to a network equipment, which includes:

determining a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication; and transmitting the DCI according to the DCI format.

In a second aspect, an embodiment of the present disclosure further provides a downlink control information (DCI) transmission device applied to a network equipment, including:

a processing module configured to determine a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication; and a transceiver module configured to transmit the DCI according to the DCI format.

In a third aspect, an embodiment of the present disclosure provides a network equipment, including:

a processor configured to determine a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication; and a transceiver configured to transmit the DCI according to the DCI format.

In a fourth aspect, an embodiment of the present disclosure provides a network equipment, including a processor, a storage, and a computer program stored on the storage and capable of running on the processor, the processor implementing, when executing the computer program, the steps of the downlink control information (DCI) transmission method as described above.

In a fifth aspect, an embodiment of the present disclosure provides a computer readable storage medium having a computer program stored thereon, the computer program implementing, when executed by a processor, the steps of the downlink control information (DCI) transmission method as described above.

Thus, the downlink control information (DCI) transmission method according to the embodiment of the present disclosure includes: determines a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication; and transmits the DCI according to the DCI format; therefore, DCI configured with a smaller payload is achieved, and under the limited resource configuration, the code rate of the PDCCH is reduced, and the coverage of the PDCCH is improved.

BRIEF DESCRIPTION OF THE DRAWINGS

In order to explain the technical solutions of the embodiments of the present disclosure more clearly, the following will briefly introduce the drawings required in the description of the embodiments of the present disclosure. Obviously, the drawings in the following description are only some embodiments of the present disclosure. For those of ordinary skill in the art, other drawings can also be obtained based on these drawings.

FIG. 1 illustrates a first flowchart of a DCI transmission method according to an embodiment of the present disclosure;

FIG. 2 illustrates a second flowchart of a DCI transmission method according to an embodiment of the present disclosure;

FIG. 5 illustrates a second exemplary diagram of time domain locations of time domain resource allocation when the CORESET, RMSI and SSB are sent together, in an embodiment of the present disclosure;

FIG. 7 illustrates a schematic diagram of time domain locations of time domain resource allocation when the RMSI and the control resource set (CORESET) are sent after the synchronization information block (SSB) is sent, in an embodiment of the present disclosure;

FIG. 8 illustrates a fourth flowchart of a DCI transmission method according to an embodiment of the present disclosure;

FIG. 11 illustrates a second exemplary diagram of the interval between aggregation transmissions in an embodiment of the present disclosure;

FIG. 12 illustrates a fifth flowchart of a DCI transmission method

DETAILED DESCRIPTION

Figure 3:
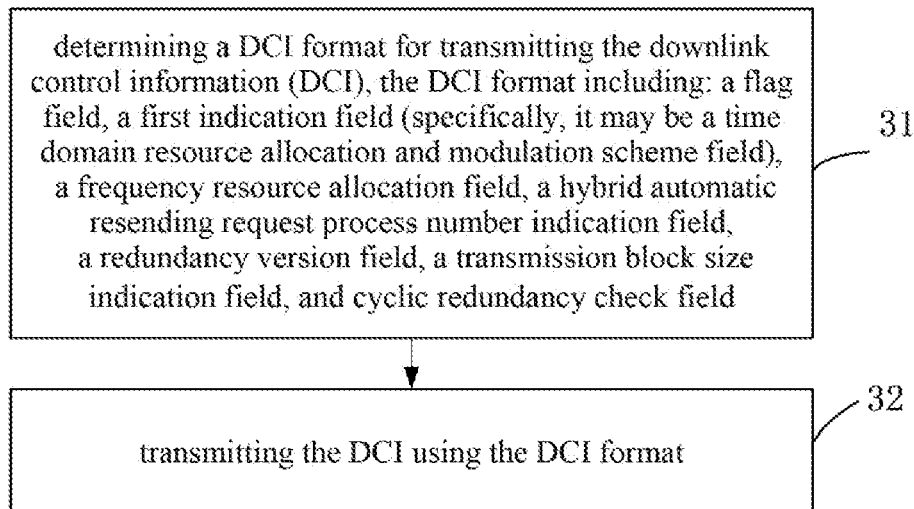
FIG. 3 illustrates a third flowchart of a DCI transmission method according to an embodiment of the present disclosure.

The exemplary embodiments of the present disclosure will be described hereinafter in more details with reference to the drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

The terms "first", "second", etc. in the specification and claims of this application are used to distinguish similar objects, and do not have to be used to describe a specific order or sequence. It should be understood that the data used in this way can be interchanged under appropriate circumstances, so that the embodiments of the present application described herein can be implemented in an order other than those illustrated or described herein, for example. In addition, the terms "comprising" and "having" and any variations thereof are intended to cover non-exclusive inclusions, for example, processes, methods, systems, products or devices that contain a series of steps or units need not be limited to those clearly listed steps or units, but may also include other steps or units that are not explicitly listed or inherent to these processes, methods, products, or devices.

As shown in FIG. 1, a downlink control information (DCI) transmission method applied to a network equipment according to an embodiment of the present disclosure includes:

Step 11, determining a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication;

Step 12, transmitting the DCI according to the DCI format.

The downlink control information (DCI) transmission method according to the embodiment of the present disclosure determines a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication; and transmits the DCI according to the DCI format; therefore, DCI configured with a smaller load is achieved, and under the limited resource configuration, the code rate of the PDCCH is reduced, and the coverage of the PDCCH is improved.

As shown in FIG. 2, the downlink control information (DCI) transmission method according to an embodiment of the present disclosure is applied to a network equipment, and includes:

Step 21, determining a DCI format for transmitting the downlink control information (DCI), the DCI format including: a first indication field, the first indication field indicating a configuration value of a time domain resource and a configuration value of a modulation order, the configuration value of the time domain resource indicated by the first indication field including: a number of OFDM symbols indicated by a time domain resource field; the configuration value of the modulation order indicated by the first indication field including: the modulation order determined according to the number of the OFDM symbols indicated by the time domain resource field.

Step 22, transmitting the DCI according to the DCI format.

Specifically, when $K \leq n \leq N$, the modulation order determined according to the number of the OFDM symbols is a first type of coding mode, the number of the OFDM symbols is indicated by the time domain resource field, where n is the number of the OFDM symbols indicated by the time domain resource allocation field, $N \geq K$, and N, K are configured values or pre-configured fixed values. The first type of coding mode here may be one of 16QAM, 64QAM, and QPSK; of course, it is not limited to these coding modes.

In this embodiment, when $N < n \leq K$, the modulation order determined according to the number of the OFDM symbols is a second type of coding mode, the number of the OFDM symbols is indicated by the time domain resource field, where n is the number of the OFDM symbols indicated by the time domain resource allocation field, $M \geq N$, and N, M are configured values or pre-configured fixed values. The second type of coding mode here may be one of 16QAM, 64QAM, and QPSK; of course, it is not limited to these coding modes.

In this embodiment, when $n > M$, the modulation order determined according to the number of the OFDM symbols is a third type of coding mode, the number of the OFDM symbols is indicated by the time domain resource field, where n is the number of the OFDM symbols indicated by the time domain resource allocation field, and M is a configured value or pre-configured fixed value. The third type of coding mode here may be one of 16QAM, 64QAM, and QPSK; of course, it is not limited to these coding modes.

In this embodiment, when $n = L$, the modulation order determined according to the number of the OFDM symbols is a fourth type of coding mode, the number of the OFDM symbols is indicated by the time domain resource field, where n is the number of the OFDM symbols indicated by the time domain resource allocation field, and L is a configured value or pre-configured fixed value. The fourth type of coding mode here may be one of 16QAM, 64QAM, and QPSK; of course, it is not limited to these coding modes.

Specifically, assuming that the symbol number of the time domain resource allocation are n OFDM symbols, when $K \leq n \leq N$ ($N \geq K$), 64 Quadrature Amplitude Modulation (Quadrature Amplitude Modulation, QAM) is adopted fixedly; when $N < n \leq M$ ($M \geq N$), 16QAM is adopted fixedly; when $n > M$, Quadrature Phase Shift Keying (Quadrature Phase Shift Keying, QPSK) coding is adopted, as shown in Table 1 below:

TABLE 1

| The number n of symbols | Modulation order |
|---|---|
| $K \leq n \leq N$ | 64QAM |
| $N < n \leq M$ | 16QAM |
| $n > M$ | QPSK |

In a specific implementation, assuming that the symbol number of the time domain resource allocation are n OFDM symbols, when $n = 2$, 64QAM is adopted fixedly; when $2 < n \leq 4$, 16 QAM is adopted fixedly; when $n > 4$, QPSK coding is adopted, as specifically shown in Table 2 below:

TABLE 2

| The number n of symbols | Modulation order |
|---|---|
| $n = 2$ | 64QAM |
| $2 < n \leq 4$ | 16QAM |
| $n > 4$ | QPSK |

Of course, in some specific scenarios, in the above method of determining the modulation order adopted by modulation order field according to the number of OFDM symbols allocated by the time domain resource field, at least one of them may be considered. As shown in the following table, it is a case that two of them are considered:

For example, assuming that there are n OFDM symbols for the time domain resource allocation, when P1≤n≤P2, 16QAM is adopted fixedly; when n>P2, QPSK coding is adopted. P1 and P2 are configured values, as shown in Table 3 below:

TABLE 3

| The number n of symbols | Modulation order |
|---|---|
| P1 ≤ n ≤ P2 | 16QAM |
| n > P2 | QPSK |

In a specific implementation, assuming that there are n OFDM symbols for the time domain resource allocation, when 2≤n≤4, 16QAM is adopted fixedly; when n>4, QPSK coding is adopted, as shown in Table 4 below:

TABLE 4

| The number n of symbols | Modulation order |
|---|---|
| 2 ≤ n ≤ 4 | 16QAM |
| n > 4 | QPSK |

As shown in FIG. 3, the downlink control information (DCI) transmission method according to an embodiment of the present disclosure is applied to a network equipment, and includes:

Step 31, determining a DCI format for transmitting the downlink control information (DCI), the DCI format including: a flag field, a first indication field (specifically, it may be a time domain resource allocation and modulation scheme field), a frequency resource allocation field, a hybrid automatic repeat request process number indication field, a redundancy version field, a transmission block size indication field, and cyclic redundancy check field;

The first indication field may use bits less than or equal to 5 bits for indication, specifically use 5 bits or 4 bits.

Step 32, transmitting the DCI according to the DCI format.

In this embodiment, a specific format of the DCI is as follows, including the following fields:

flag;
frequency domain resource allocation;
time domain resource allocation and modulation scheme: a time domain resource allocation field and a modulation order field;
TB size indication; and
cyclic redundancy check (cyclic redundancy check, CRC).

Wherein, the modulation order field and the time domain resource allocation field function in a joint indication manner. Assuming that there are n OFDM symbols for the time domain resource allocation, when K≤n≤N (N≥K), 64QAM is adopted fixedly; when N<n≤M (M≥N), 16QAM is adopted fixedly; when n>M, QPSK coding is adopted, as shown in Table 5 below:

TABLE 5

| The number n of symbols | Modulation order |
|---|---|
| K ≤ n ≤ N | 64QAM |
| N < n ≤ M | 16QAM |
| n > M | QPSK |

In a specific implementation of this embodiment of the present disclosure, when the DCI is scrambled by SI-RNTI, the DCI is used for scheduling RSI/OSI, and compact DCI may adopt the following field values:

frequency domain resource allocation: 9 bits;
time domain resource allocation and modulation scheme: 5 bits;
TB size indication: 3 bits;
HARQ process number indication: 1 bit;
RV: 1 bit;
CRC: 16 bits;
frequency domain resource allocation: 9 bits;
when the initial BWP is limited to 24 RBs, the frequency domain resource allocation granularity is 1 RB;
when the initial BWP is limited to 48 RBs, the frequency domain resource allocation granularity is 2 RB;
when the initial BWP is limited to 96 RBs, the frequency domain resource allocation granularity is 4 RB;
The downlink resource allocation type1 is used for allocation.

The time domain resource allocation and modulation scheme: a time domain resource allocation table is configured by default, in which 5 bits can be used to indicate time domain resource allocation for SI, and each code point indicates a type of time domain resource allocation configuration in the table.

The TB size indication may be indicated by using bits less than or equal to 5 bits, e.g., 3 bits are used for indicating the size of the transmission block.

Wherein, when the modulation order field and the time domain resource allocation field are used in a joint indication manner, assuming that there are n OFDM symbols for the time domain resource allocation, when n=2, 64QAM is adopted fixedly; when 2<n≤4, 16 QAM is adopted fixedly; when n>4, QPSK coding is adopted, as shown in Table 6 below:

TABLE 6

| The number n of symbols | Modulation order |
|---|---|
| N = 2 | 64QAM |
| 2 < n ≤ 4 | 16QAM |
| n > 4 | QPSK |

Figure 4:
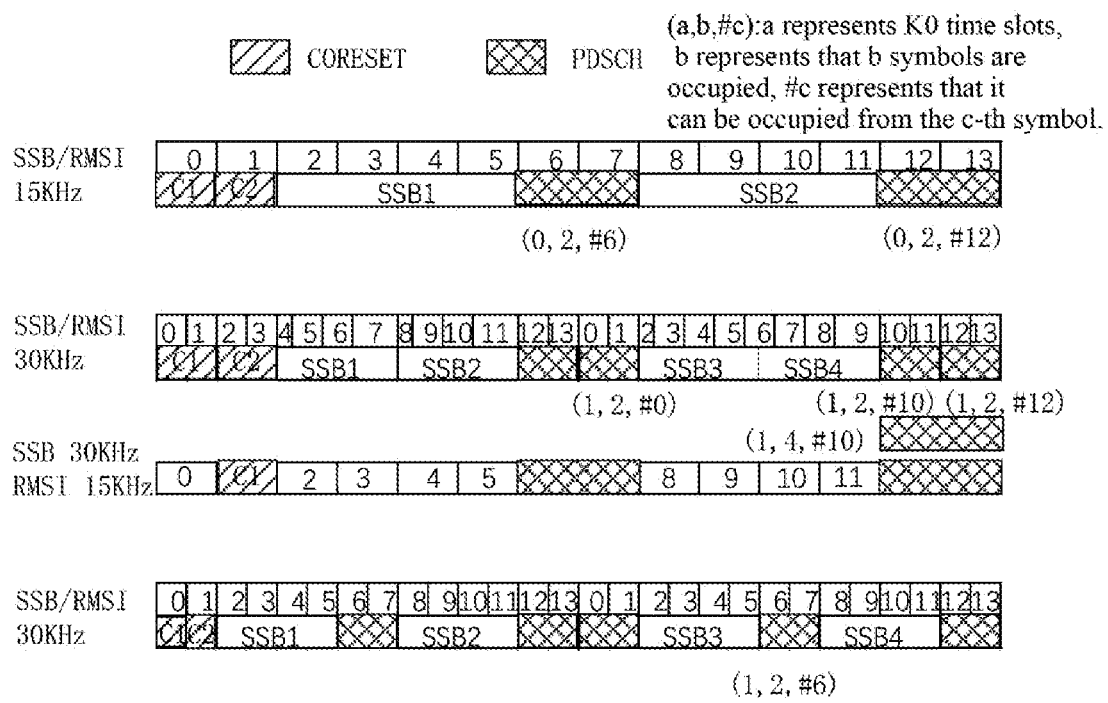
FIG. 4 illustrates a first exemplary diagram of time domain locations of time domain resource allocation when the CORESET, RMSI and SSB are sent together, in an embodiment of the present disclosure.

The time domain resource allocation field is defined relative to the slot boundary:

for example, if the control resource set (CORESET), RMSI and synchronization information block (synchronization information block, SSB) are sent together, a possible value of the time domain resource allocation field is:

as shown in FIG. 4, if the low frequency range is used, the numerology used by the SSB synchronization information block is 15 KHz or 30 KHz, and at this time, time-division multiplexing (TDM) is performed on the SSB and RMSI.

In the case of TDM, the time domain resources and the SSB occupied by the RMSI and the RMSI scheduled by the CORESET are sent on different time domain symbols.

When a sub carrier spacing (SCS) of 15 KHz for the SSB is adopted, a maximum of 2 SSBs can be placed in a slot. Their locations are as shown in FIG. 4.

In this case, if a sub carrier spacing (SCS) of 15 KHz for the RMSI is adopted, TDM may be adopted for the SSB and the RMSI. The location of the CORESET where the RMSI control signaling is located is calculated based on the location of the SSB. The possible location is shown in FIG.

4, then the RMSI may be scheduled in the remaining unoccupied resources, as shown in the figure.

In a case that the occupied resource is (0, 2, #6), "0" represents that the PDSCH is offset from the CORESET that schedules the PDSCH by 0 slots, that is, they are transmitted in the same slot, "2" represents that 2 OFDM symbols are occupied in the PDSCH transmission, "#6" represents that the PDSCH can be occupied from the symbol with the slot number 6 (that is, the seventh OFDM symbol in the slot).

As shown in FIG. 4 again, an SCS of 30 KHz for the SSB is adopted, 4 SSBs can be placed in two slots, and their locations are as shown in FIG. 4. If an SCS of 30 KHz for the RMSI is adopted, the resources it can occupy are shown in the figure. In a case that the occupied resource is (1,4, #10), "1" represents that the PDSCH is offset from the CORESET that schedules the PDSCH by 1 slot, that is, it is transmitted in the next slot of the slot where the CORESET is located, "4" represents that 4 OFDM symbols are occupied in the PDSCH transmission, "#10" represents that the PDSCH can be occupied from the symbol with the slot number 10 (that is, the eleventh OFDM symbol in the slot).

Figure 5:
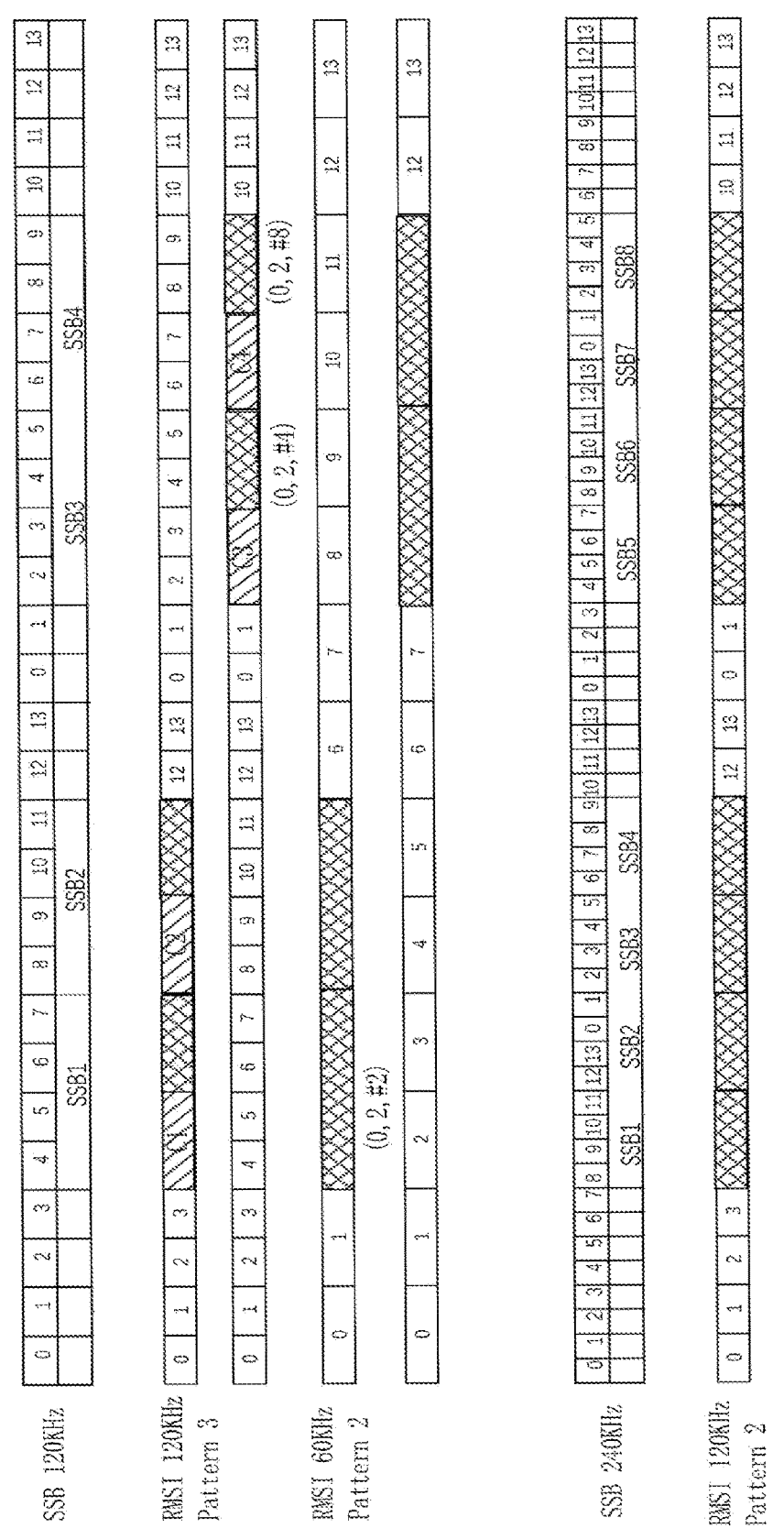

As shown in FIG. 5, if the high frequency range is used, the numerology used by the SSB synchronization information block is 120 KHz or 240 KHz, and at this time, frequency-division multiplexing (FDM) or time-division multiplexing (TDM) may be performed on the SSB and RMSI.

In the case of FDM, it means that the time domain resources occupied by the RMSI are within the range of the time domain resources occupied by the SSB and the frequency domain resources available for the RMSI and the RMSI are different.

If the SCS for the SSB is 120 KHz, a maximum of 4 SSBs can be transmitted in 2 slots, and the specific locations are shown in FIG. 5. If an SCS of 120 kHz is configured for the RMSI, the resources available for it may be as shown in the figure, and are represented as (0,2,#6), (0,2,#10).

Figure 6:
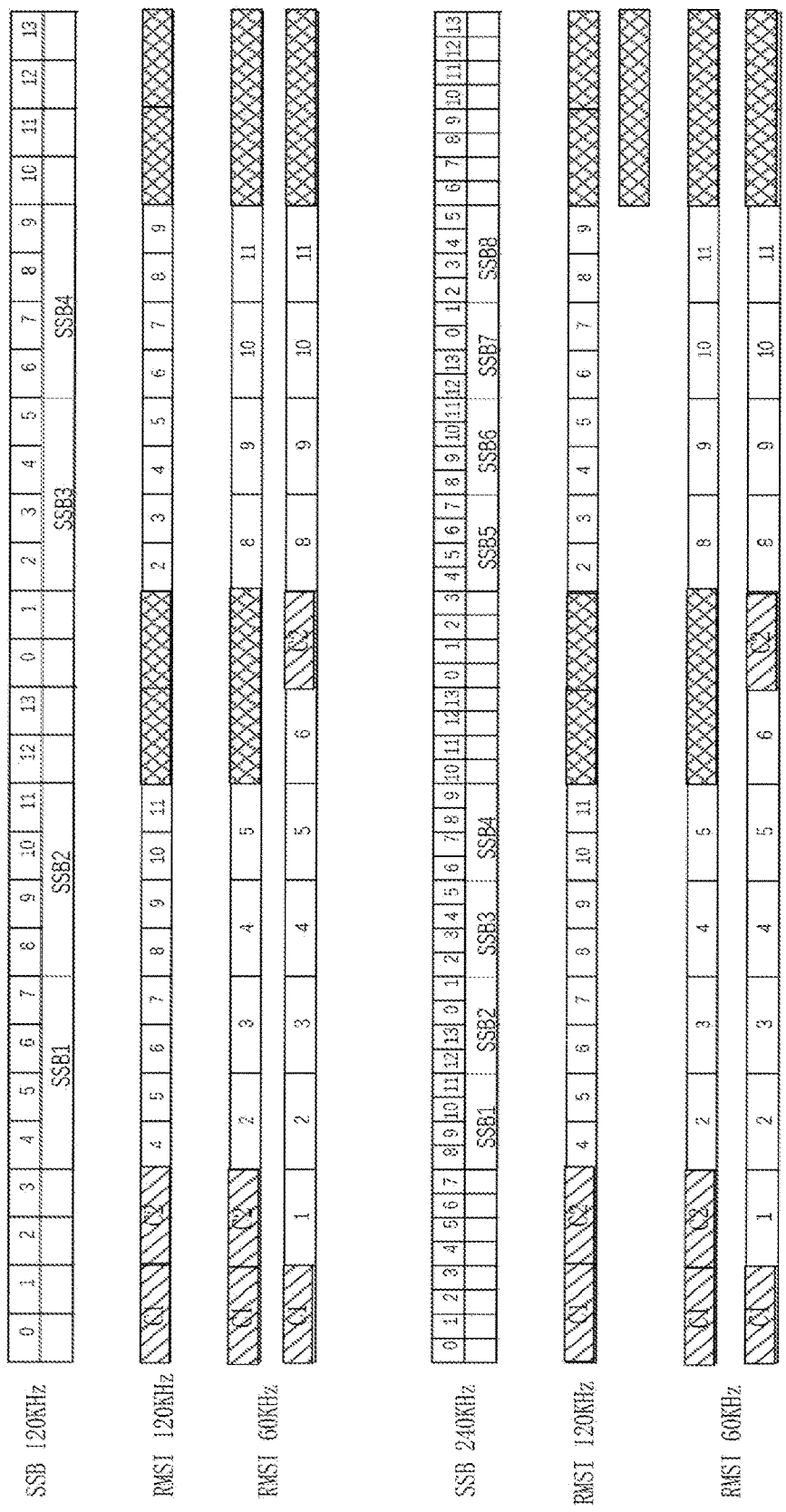
FIG. 6 illustrates a third exemplary diagram of time domain locations of time domain resource allocation when the CORESET, RMSI and SSB are sent together, in an embodiment of the present disclosure.

As shown in FIG. 6, in the case of TDM, it means that the time domain resources and the SSB occupied by the RMSI and the RMSI scheduled by the CORESET are sent on different time domain symbols. If the SCS for the SSB is 120 KHz, a maximum of 8 SSBs can be transmitted in 4 slots, and the locations are shown in FIG. 6. In this case, if the sub carrier spacing of 120 KHz for the RMSI is adopted, the resources that the RMSI can occupy is as shown in the figure. As can be seen from FIGS. 4 to 6, the available time domain resource configurations are: (0, 2, #2), (0, 2, #4), (0, 2, #6), (0, 2, #8), (0, 2, #12); (1, 2, #0), (1, 2, #6), (1, 2, #10), (1, 2, #12); (1, 4, #10); there are 10 time domain resource allocation schemes in total.

If the RMSI and the control resource set (CORESET) are sent after the synchronization information block (SSB) is sent, the location of the RMSI is not limited by the location of the SSB.

There are three possible locations of the CORESET, as shown in FIG. 7:

N=2, M=½, as shown in case 1 and case 1' in the figure;
N=1, M=1, as shown in case 2 in the figure;
N=1, M=2, as shown in case 3 in the figure;
N represents the number of search spaces in a slot, and M is a parameter defined in the protocol. According to M and N, the time domain relative location relationship between the PDCCH monitoring windows of the Type 0 common search space corresponding to two consecutive nominal SSBs (there may be other symbols between two consecutive SSBs) may be determined.

Assuming that the CORESET and the RMSI are scheduled in a same slot, i.e., K0=0, the time domain resource allocation scheme may be: a configuration in which the PDSCH can be sent after the PDCCH is sent. It has the time domain resource configurations below: (0, 4, #2), (0, 4, #4), (0, 4, #6), (0, 4, #10); (0, 7, #2), (0,7, #4), (0,7, #7); (0, 12, #2); (0, 10, #2).

In a case that 14 symbols are scheduled, assuming that K0=1, the time domain configuration is (1, 14, #0), and there are also 10 cases in total. In combination with FIGS. 4 to 6 above, there are 20 cases in total. As shown in Table 7 below, other code points can be reserved, here one configuration is one code point:

TABLE 7

| Index | Length (time domain symbol length occupied by PDSCH) | Modulation order | Starting slot | Starting symbol |
|---|---|---|---|---|
| 0 | 2 | 64QAM | 0 | 2 |
| 1 | 2 | 64QAM | 0 | 4 |
| 2 | 2 | 64QAM | 0 | 6 |
| 3 | 2 | 64QAM | 0 | 8 |
| 4 | 2 | 64QAM | 0 | 12 |
| 5 | 2 | 64QAM | 1 | 0 |
| 6 | 2 | 64QAM | 1 | 6 |
| 7 | 2 | 64QAM | 1 | 10 |
| 8 | 2 | 64QAM | 1 | 12 |
| 9 | 4 | 16QAM | 0 | 2 |
| 10 | 4 | 16QAM | 0 | 4 |
| 11 | 4 | 16QAM | 0 | 6 |
| 12 | 4 | 16QAM | 0 | 10 |
| 13 | 4 | 16QAM | 1 | 10 |
| 14 | 7 | QPSK | 0 | 2 |
| 15 | 7 | QPSK | 0 | 4 |
| 16 | 7 | QPSK | 0 | 7 |
| 17 | 10 | QPSK | 0 | 2 |
| 18 | 12 | QPSK | 0 | 2 |
| 19 | 14 | QPSK | 1 | 0 |
| 20-31 | Reserved | | | |

In this embodiment, the TB size indication may be indicated by using 3 bits.

By using 000 to represent the minimum TBS of SI and 111 to represent the maximum TBS of SI; the SI is quantized into 8 values and the size of each code point is defined, as shown in Table 8 below:

TABLE 8

| | $I_{TBS}$ | | | | | | | |
|---|---|---|---|---|---|---|---|---|
| | 0 | 1 | 2 | 3 | 4 | 5 | 6 | 7 |
| TBS | 40 | 136 | 224 | 328 | 552 | 776 | 1064 | 1736 |

In this embodiment, when the DCI is scrambled by P-RNTI, the DCI is used for scheduling paging, and the DCI may adopt the following field values:

flag: 1 bit;
frequency domain resource allocation: 9 bits;
time domain resource allocation and modulation scheme: 4 bits;
CRC: 16 bits;
the flag field is used to distinguish paging/direct indication, and 0 represents the direct indication, 1 represents the paging.
the frequency domain resource allocation field: when BWP is limited to 24 RBs, the frequency domain resource allocation granularity is 1 RB; when BWP is limited to 48 RBs, the frequency domain resource allocation granularity is 2 RBs; and when BWP is limited to 96 RBs, the frequency domain resource allocation granularity is 4 RBs. Downlink resource allocation type1 is adopted for allocation.

In the embodiment of the present disclosure, the time domain resource allocation and modulation command of the time domain resource allocation and modulation scheme field is as follows:

predefining a table, for example, configuring a 16-line time domain resource allocation table by default. Of course, the configuration value in this table is not limited to 16 lines. In the case of 16 lines, 4 bits can be used to indicate the time domain resource allocation for the paging, and each code point indicates a time domain resource allocation configuration in the table.

When the modulation order field and the time domain resource allocation field are used in a joint indication manner, assuming that there are n OFDM symbols for the time domain resource allocation, when n=2, 64QAM is adopted fixedly; when 2<n≤4, 16 QAM is adopted fixedly; when n>4, QPSK coding is adopted, as shown in Table 9 below:

TABLE 9

| The number n of symbols | Modulation order |
|---|---|
| N = 2 | 64QAM |
| 2 < n ≤ 4 | 16QAM |
| n > 4 | QPSK |

The time domain resource allocation may adopt the following configuration: defining a table, the configuration value in the table are not limited to 16 lines. For example, when 16 time domain resource allocation modes are configured, the time domain resource configuration is indicated by 4 bits, as shown in Table 10 below:

TABLE 10

| index | Length | Modulation order | Starting slot | Starting symbol |
|---|---|---|---|---|
| 0 | 2 | 64QAM | 0 | 2 |
| 1 | 2 | 64QAM | 0 | 6 |
| 2 | 2 | 64QAM | 0 | 12 |
| 3 | 2 | 64QAM | 1 | 0 |
| 4 | 2 | 64QAM | 1 | 12 |
| 5 | 4 | 16QAM | 0 | 2 |
| 6 | 4 | 16QAM | 0 | 4 |
| 7 | 4 | 16QAM | 0 | 6 |
| 8 | 4 | 16QAM | 0 | 10 |
| 9 | 4 | 16QAM | 1 | 10 |
| 10 | 7 | QPSK | 0 | 2 |
| 11 | 7 | QPSK | 0 | 4 |
| 12 | 7 | QPSK | 0 | 7 |
| 13 | 10 | QPSK | 0 | 2 |
| 14 | 12 | QPSK | 0 | 2 |
| 15 | 14 | QPSK | 1 | 0 |

When the TB size indication is indicated by 3 bits, by using 000 to represent the minimum TBS of paging and 111 to represent the maximum TB S of paging information, the paging information is quantized into 8 values and the size of each code point is defined.

TABLE 11

| | ITBS | | | | | | | |
|---|---|---|---|---|---|---|---|---|
| | 0 | 1 | 2 | 3 | 4 | 5 | 6 | 7 |
| TBS | 40 | 136 | 224 | 328 | 552 | 776 | 1064 | 1736 |

As shown in FIG. 8, the downlink control information (DCI) transmission method according to an embodiment of the present disclosure is applied to a network equipment, and includes:

Step 81, determining a DCI format for transmitting the downlink control information (DCI), the DCI format including a time domain resource allocation field and an aggregation transmission indication field; or the DCI format including a second indication field, the second indication field indicating a configuration value of a time domain resource and a configuration value of an aggregate transmission indication;

Step 82, transmitting the DCI according to the DCI format.

In this embodiment, when the DCI format include the time domain resource allocation field and the aggregation transmission indication field, the time domain resource allocation field is used to indicate a configuration value of a first type;

the configuration value of the first type is one of L1 types of configuration values, and the L1 types of configuration values are L1 types of configurations from all or part of configurations of the time domain resource;

wherein the configuration value of the first type includes the time domain symbol length occupied by a PDSCH and an offset value, the offset value represents an offset of the PDSCH relative to a start OFDM symbol or end OFDM symbol of the control resource set; L1 is a configured value.

The time domain resource allocation field uses 2 bits for indication. Of course, bits with other length may be used for indication.

In a specific implementation, when the time domain resource allocation corresponds to 2 bits, 4 configurations can be selected for the UE from the following Table 12. The 4 configuration values may be predefined or configured by high level through high-level signaling. When a time domain resource allocation is indicated by 2 bits, the use of the 2 bits means that one configuration value is selected to configure to the UE:

TABLE 12

| Length (time domain symbol length occupied by PDSCH) | Offset |
|---|---|
| 2 | Candidate value set is {0, 1, 2, 3} |
| 4 | Candidate value set is {0, 1, 2, 3} |
| 7 | Candidate value set is {0, 1, 2, 3} |

Figure 9:
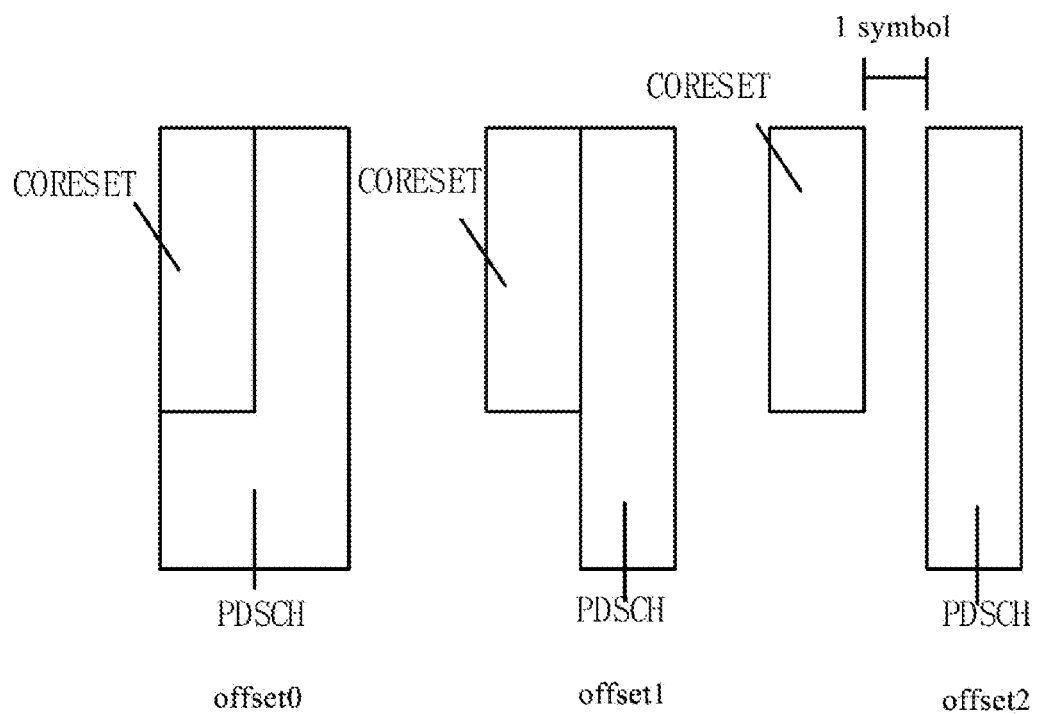
FIG. 9 illustrates an exemplary diagram of the symbol offset of the PDSCH relative to the CORESET in an embodiment of the present disclosure.

Length as shown in this table represents the time domain symbol length occupied by the physical downlink sharing channel (PDSCH); and Offset represents the symbol offset value relative to the control resource set (CORESET). Examples are shown in FIG. 9.

In this embodiment, when the DCI format include the time domain resource allocation field and the aggregation transmission indication field, the aggregation transmission indication field is used to indicate a configuration value of a second type;

the configuration value of the second type is one of L2 types of configuration values, and the L2 types of configuration values are L2 types of configurations from all or part of configurations of the aggregation transmission indication field;

wherein the configuration value of the second type includes an aggregation level and an interval, the interval is an interval between aggregation transmissions; L2 is a configured value.

Wherein, the aggregation transmission indication field uses 2 bits for indication when it is used alone for indication. Of course, bits with other length may be used for indication.

In a specific implementation, the configuration of the aggregation transmission indication field includes therein the aggregation level (1,2,4,8) and the interval, between aggregation transmissions. 4 configuration values may be selected from the table below, and 2 bits indicate that one configuration value is selected to configure to the UE. As shown in Table 13:

TABLE 13

| AL | Interval |
|---|---|
| 1 | Candidate value set is {0, 1, 2} |
| 2 | Candidate value set is {0, 1, 2} |
| 4 | Candidate value set is {0, 1, 2} |
| 8 | Candidate value set is {0, 1, 2} |

Figure 10:
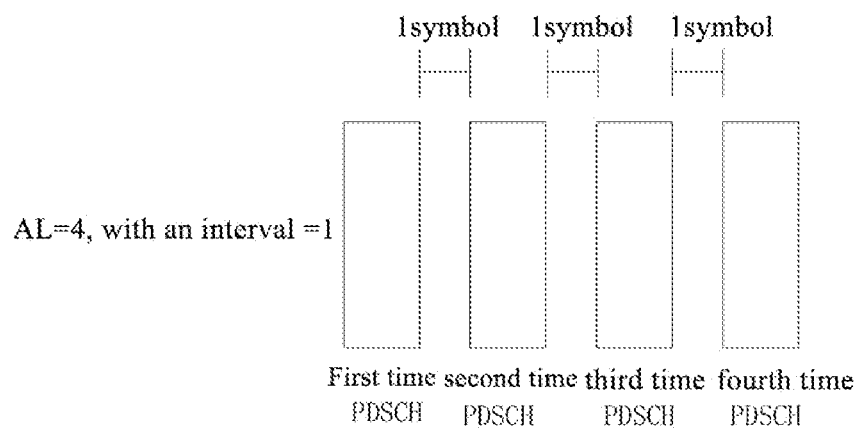
FIG. 10 illustrates a first exemplary diagram of the interval between aggregation transmissions in an embodiment of the present disclosure.

Interval as shown in this table represents the interval between the aggregation transmissions. Examples are shown in FIGS. 10 and 11.

In this embodiment, when the DCI format include the second indication field, the configuration value of the time domain resource and the configuration value of the aggregation transmission indication indicated by the second indication field include a configuration value of a third type;

the configuration value of the third type is one of L3 types of configuration values, and the L3 types of configuration values are L3 types of configurations from all or part of configurations of the time domain resource field and the aggregation transmission indication field;

wherein the configuration value of the third type includes a time domain symbol length occupied by a physical downlink sharing channel, an offset value, an aggregation level, and an interval between aggregation transmissions; L3 is a configured value.

In a specific implementation, a table may be configured for the UE according to a predefined size by the high-level signaling. For example, the RRC configures 16 configuration values for the UE and they are indicated using 4 bits, as shown in Table 14 below:

TABLE 14

| Length (time domain symbol length occupied by PDSCH) | Offset | AL (aggregation level) | Interval (interval between aggregation transmissions) |
|---|---|---|---|
| 0 | 2 | 0 | 1 | — |
| 1 | 2 | 1 | 1 | — |
| 2 | 2 | 2 | 2 | 2 |
| 3 | 2 | 3 | 2 | 1 |
| 4 | 2 | 2 | 4 | 2 |
| 5 | 2 | 1 | 8 | 1 |
| 6 | 4 | 0 | 1 | — |
| 7 | 4 | 1 | 1 | — |
| 8 | 4 | 2 | 2 | 2 |
| 9 | 4 | 3 | 2 | 1 |
| 10 | 4 | 2 | 4 | 2 |
| 11 | 4 | 1 | 8 | 1 |
| 12 | 7 | 1 | 1 | — |
| 13 | 7 | 2 | 2 | 2 |
| 14 | 7 | 3 | 4 | 1 |
| 15 | 7 | 2 | 8 | 1 |

As shown in FIG. 12, the downlink control information (DCI) transmission method according to an embodiment of the present disclosure is applied to a network equipment, and includes:

Step 121, determining a DCI format for transmitting the downlink control information (DCI), the DCI format including a time domain resource allocation field and an aggregation transmission indication field; or the DCI format including a second indication field, the second indication field indicating a configuration value of a time domain resource and a configuration value of an aggregate transmission indication;

the DCI format further includes at least one of: a DCI format identifier field, a frequency domain resource allocation field, a virtual resource block (VRB)-to-physical resource block (PRB) mapping field, a modulation and coding scheme field, a new data indication field, a redundancy version field, a hybrid automatic repeat request (HARD) process number indication field, a downlink allocation index indication field, a physical uplink control channel (PUCCH) transmission power control (TPC) indication field, a PUCCH resource indication field, a physical downlink sharing channel (PDSCH)-to-HARQ feedback time indication field, and a cyclic redundancy check field.

Step 122, transmitting the DCI according to the DCI format.

In a specific implementation, when the DCI is scrambled by C-RNTI, the DCI is used for scheduling data in URLLC scenarios, where the time domain resource allocation field and the aggregation transmission field are used separately for indication, and their field values are as follows:
identifier for DCI formats: 1 bit;
frequency domain resource allocation: X bits;
time domain resource allocation: 2 bits;
aggregation transmission indication: 2 bits;
VRB-to-PRB mapping: 1 bit;
modulation and coding scheme: 2 bits;
new data indicator: 1 bit;
redundancy version: 1 bit;
HARQ process number: 2 bits;
downlink assignment index: 0 bit;
TPC command for PUCCH: 2 bits;
PUCCH resource indicator: 2 bits;
PDSCH-to-HARQ feedback timing indicator: 1 bit;
CRC;

Among them, as for PDSCH-to-HARQ feedback timing indicator: 1 bit, one state indicates that the PDSCH and HARQ-ack are transmitted in the same slot, and the other state indicates that the HARQ-ack is transmitted in the subsequent slot immediately adjacent to the slot where the PDSCH is located.

When the DCI is scrambled by C-RNTI, the DCI may be used for scheduling data in URLLC scenarios, where the time domain resource allocation field and the aggregation transmission field are used jointly for indication, and their field values are as follows:
identifier for DCI formats: 1 bit;
frequency domain resource allocation: X bit;
time domain resource allocation & aggregation transmission indication: 4 bits;
VRB-to-PRB mapping: 1 bit;
modulation and coding scheme: 2 bits;
new data indicator: 1 bit;
redundancy version: 1 bit;
HARQ process number: 2 bits;
downlink assignment index: 0 bit;
TPC command for PUCCH: 2 bits;
PUCCH resource indicator: 2 bits;
PDSCH-to-HARQ feedback timing indicator: 1 bit;
CRC;

Among them, as for PDSCH-to-HARQ feedback timing indicator: 1 bit, one state indicates that the PDSCH and HARQ-ack are transmitted in the same slot, and the other state indicates that the HARQ-ack is transmitted in the subsequent slot adjacent to the slot where the PDSCH is located.

When the DCI is scrambled by C-RNTI, the DCI may be used for scheduling downlink data in URLLC scenarios, where the time domain resource allocation field and the aggregation transmission field are used jointly for indication, and their field values are as follows:

identifier for DCI formats: 1 bit;
frequency domain resource allocation: X bit;
modulation and coding scheme: 2 bits;

When the DCI is scrambled by C-RNTI, the DCI may be used for scheduling uplink data in URLLC scenarios, where the time domain resource allocation field and the aggregation transmission field are used jointly for indication, and their field values are as follows:

identifier for DCI formats: 1 bit;
frequency domain resource allocation: X bit;
modulation and coding scheme: 2 bits;

In the methods of the above embodiments of the present disclosure, at least one of the time domain resource allocation field, the modulation order field, and the aggregate transmission indication field is added in the DCI, and the time domain resource allocation field and the modulation order field are used for indication jointly, or the time domain resource allocation field and the aggregate transmission indication field for indication jointly; thus, the payload of DCI is reduced, and under the limited resource configuration, the code rate of the PDCCH is reduced, the coverage of the PDCCH is improved. When DCI is used to schedule SI/paging, the coverage of DCI used to schedule SI/paging can be improved, and the spectral efficiency of SI/paging can be also improved while reducing the code rate. When DCI is used to schedule PDSCH/PUSCH transmission in the URLLC scenario, the reliability of DCI transmission can be improved.

It should be noted that, in the above embodiments of the present disclosure, the configuration values in the tables are only examples, and do not include all configuration values, and the specific configuration values are not limited to the values listed in the table. In the above embodiments of the present disclosure, when any of the fields of the DCI is used for indication, its specific bit length used may not be limited to the values listed in the above embodiments, but other length bits may also be used for indication, or other indication manners may be used.

The above embodiments describe the DCI transmission methods in different scenarios in detail. The following embodiments will further describe their corresponding devices and equipment with reference to the drawings.

Figure 13:
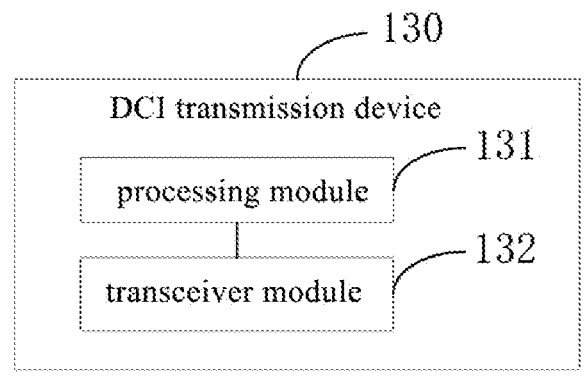
FIG. 13 illustrates a block diagram of a DCI transmission device according to an embodiment of the present disclosure.

As shown in FIG. 13, the downlink control information (DCI) transmission device 130 of the embodiment of the present disclosure can realize the details of the DCI transmission methods described in all the above embodiments and achieve the same effects. The DCI transmission device 130 is specifically includes the following functional modules:

a processing module 131 configured to determine a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication;

a transceiver module 132 configured to transmit the DCI according to the DCI format.

In this embodiment, the configuration value of the time domain resource indicated by the first indication field includes: a number of OFDM symbols indicated by a time domain resource field;

the configuration value of the modulation order indicated by the first indication field includes: the modulation order determined according to the number of the OFDM symbols indicated by the time domain resource field.

Wherein, when $K \leq n \leq N$, the modulation order determined according to the number of the OFDM symbols is a first type of coding mode, the number of the OFDM symbols is indicated by the time domain resource field, where n is the number of the OFDM symbols indicated by the time domain resource allocation field, $N \geq K$, and N, K are configured values or pre-configured fixed values.

Wherein, when $N < n \leq K$, the modulation order determined according to the number of the OFDM symbols is a second type of coding mode, the number of the OFDM symbols is indicated by the time domain resource field, where n is the number of the OFDM symbols indicated by the time domain resource allocation field, $M \geq N$, and N, M are configured values or pre-configured fixed values.

Wherein, when $n > M$, the modulation order determined according to the number of the OFDM symbols is a third type of coding mode, the number of the OFDM symbols is indicated by the time domain resource field, where n is the number of the OFDM symbols indicated by the time domain resource allocation field, and M is a configured value or pre-configured fixed value.

Wherein, when $n = L$, the modulation order determined according to the number of the OFDM symbols is a fourth type of coding mode, the number of the OFDM symbols is indicated by the time domain resource field, where n is the number of the OFDM symbols indicated by the time domain resource allocation field, and L is a configured value or pre-configured fixed value.

The first, second, third and fourth types of coding modes here may be one of 16QAM, 64QAM, and QPSK, respectively; of course, they are not limited thereto.

In this embodiment, the DCI further includes at least one of: a flag field, a frequency resource allocation field, a hybrid automatic repeat request (HARQ) process number indication field, a redundancy version field, a transmission block size indication field, and cyclic redundancy check field.

In another specific embodiment of the present disclosure, the time domain resource allocation field is used to indicate a configuration value of a first type; the configuration value of the first type is one of L1 types of configuration values, and the L1 types of configuration values are L1 types of configurations from all or part of configurations of the time domain resource;

wherein the configuration value of the first type includes a time domain symbol length occupied by a PDSCH and an offset value, the offset value represents an offset of the PDSCH relative to a start OFDM symbol or end OFDM symbol of a control resource set; L1 is a configured value.

Wherein, the aggregation transmission indication field is used to indicate a configuration value of a second type;

the configuration value of the second type is one of L2 types of configuration values, and the L2 types of configuration values are L2 types of configurations from all or part of configurations of the aggregation transmission indication field;

wherein the configuration value of the second type includes an aggregation level and an interval, the interval is an interval between aggregation transmissions; L2 is a configured value.

Wherein, the configuration value of the time domain resource and the configuration value of the aggregation transmission indication indicated by the second indication field include a configuration value of a third type;

the configuration value of the third type is one of L3 types of configuration values, and the L3 types of configuration values are L3 types of configurations from all or part of configurations of the time domain resource field and the aggregation transmission indication field;

wherein the configuration value of the third type includes a time domain symbol length occupied by a physical downlink sharing channel, an offset value, an aggregation level, and an interval between aggregation transmissions; L3 is a configured value.

In this embodiment, the DCI further includes at least one of: a DCI format identifier field, a frequency domain resource allocation field, a virtual resource block (VRB)-to-physical resource block (PRB) mapping field, a modulation and coding scheme field, a new data indication field, a redundancy version field, a hybrid automatic repeat request (HARD) process number indication field, a downlink allocation index indication field, a physical uplink control channel (PUCCH) transmission power control (TPC) indication field, a PUCCH resource indication field, a physical downlink sharing channel (PDSCH)-to-HARQ feedback time indication field, and a cyclic redundancy check field.

It should be noted that, the DCI transmission device of the embodiment of the present disclosure is implemented in the same manner as the above method, and all the implementations in the above methods are applicable to the embodiment of the device and the same technical effects can also be achieved.

Figure 14:
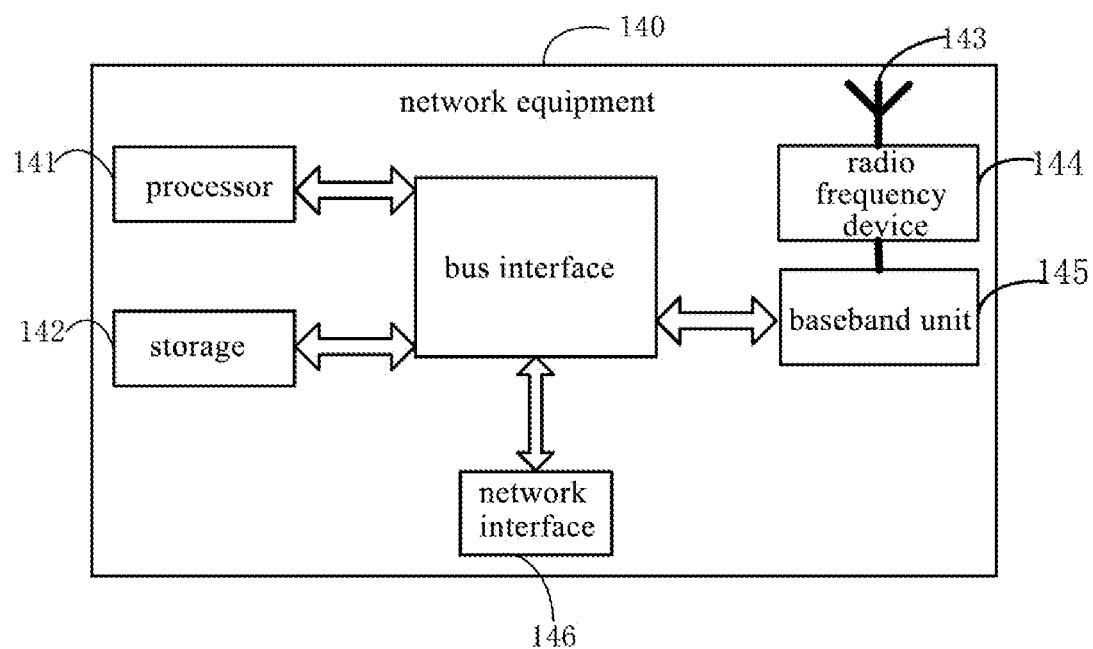
FIG. 14 illustrates a block diagram of a network equipment according to an embodiment of the present disclosure.

In order to achieve the above object better, as shown in FIG. 14, an embodiment of the present disclosure further provides a network equipment 140 which includes:

a processor 141 configured to determine a DCI format for transmitting the downlink control information (DCI), the DCI format including: a time domain resource allocation field, an aggregation transmission indication field, a first indication field or a second indication field, the first indication field indicating a configuration value of a time domain resource and a configuration value of a modulation order, the second indication field indicating a configuration value of a time domain resource and a configuration value of an aggregate transmission indication;

a transceiver configured to transmit the DCI according to the DCI format, which may specifically include an antenna, a radio frequency device, etc.

The network equipment may further include: an antenna 143, a radio frequency device 144, a baseband device 154. The antenna 143 is connected to the radio frequency device 144. In the uplink direction, the radio frequency device 144 receives information through the antenna 143, and sends the received information to the baseband device 145 for processing. In the downlink direction, the baseband device 145 processes the information to be sent and sends it to the radio frequency device 144, and the radio frequency device 144 processes the received information and sends it through the antenna 143.

The above DCI transmission device may be located in the baseband device 145. The method executed by the network equipment in the above embodiment may be implemented in the baseband device 145. The baseband device 145 includes a processor 141 and a storage 142.

The baseband device 145 may include, for example, at least one baseband board, and a plurality of chips are provided on the baseband board. As shown in FIG. 14, one of the chips is, for example, the processor 141, connected to the storage 142 to call the program in the storage 142 and execute the operations shown in the above method embodiments.

The baseband device 145 may further include a network interface 146 for exchanging information with the radio frequency device 144. For example, this interface is a common public radio interface (CPRI).

The processor here may be a single processor, or a collective term for multiple processing elements. For example, the processor may be a CPU, or an ASIC, or one or more integrated circuits configured to implement the methods performed by the above network equipment, such as one or more microprocessors, one or more DSPs, or one or more field programmable gate array FPGAs, or the like. The storage element may be a single storage or a collective term for multiple storage elements.

The storage 142 may be a volatile memory or a nonvolatile memory, or may include both the volatile and nonvolatile memory. Among them, the non-volatile memory may be a read-only memory (ROM), a programmable ROM (PROM), an erasable PROM (EPROM), an electronically EPROM (EEPROM) or a flash memory. The volatile memory may be a random access memory (RAM), which is used as an external cache. By way of example but not limitation, many forms of RAMs are available, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), and a direct Rambus RAM (DRRAM). The storage 142 described in this application is intended to include, but is not limited to, these and any other suitable types of storages.

An embodiment of the present disclosure further provides a network equipment which includes a processor, a storage, and a computer program stored on the storage and capable of running on the processor, the processor implementing, when executing the computer program, the steps of the downlink control information (DCI) transmission method as mentioned above.

The network equipment of the embodiment of the present disclosure further includes a computer program stored on the storage and capable of running on the processor, and the processor calls the computer program in the storage to execute the methods performed by the modules shown in FIG. 13.

Specifically, when called by the processor 141, the computer program may be used to execute the steps of the DCI transmission methods as mentioned above.

Wherein, the network equipment may be a Base Division Receiver (BTS) in the Global System of Mobile Communication (GSM) or the Code Division Multiple Access (CDMA), or may be a NodeB (NB) in the Wideband Code Division Multiple Access (WCDMA), or may be an Evolutional Node B (eNB or eNodeB) or a relay station or an access point in the LTE, or a base station in future 5G networks, etc., which is not limited here.

When the DCI configured in the network equipment in the embodiment of the present disclosure is used to schedule SI/paging, the coverage of the DCI used to schedule the SI/paging can be improved, and the spectral efficiency of the SI/paging can also be improved while the code rate is reduced and the coverage of the SI/paging is improved. When the DCI is used to schedule PDSCH/PUSCH transmission in the URLLC scenarios, the reliability of DCI transmission can be improved.

It should be noted that, the above division of the various modules of the network equipment and the terminal is only a division of logical functions, and in an actual implementation, they may be fully or partially integrated into a physical entity or may be physically separated. Moreover, these modules can all be implemented in the form of software and be called through processing elements; they can also be implemented in the form of hardware; or some modules can be implemented in the form of software and be called through processing elements, while others can be implemented in the form of hardware. For example, the determination module may be a separately established processing element, or it may be integrated in a chip of the above device, and may also be stored in the storage of the above device in the form of program codes, and be called by a certain processing element of the above device to execute the function of the above determination module. The implementations of other modules are similar. In addition, all or part of these modules can be integrated together or can be implemented independently. The processing element described here may be an integrated circuit with signal processing capabilities. In an implementation, steps of the above methods or the above modules may be implemented by an integrated logic circuit of hardware in the processor element or by instructions in the form of software.

For example, the above modules may be one or more integrated circuits configured to implement the above methods, such as one or more Application Specific Integrated Circuit (ASIC), or one or more microprocessors, or one or more digital signal processors (DSP), or one or more Field Programmable Gate Array (FPGA), etc. As another example, when a certain module above is implemented by a processing element calling program codes, the processing element may be a general-purpose processor, such as a central processing unit (CPU) or other processor that can call program codes. As another example, these modules can be integrated together and implemented in the form of a system-on-a-chip (SOC).

The computer readable storage medium may be such as a read-only memory (ROM), a random access memory (RAM), a magnetic disk, or an optical disk, etc.

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of the present disclosure.

Those skilled in the art can clearly understand that, for the convenience and conciseness of the description, the specific working processes of the systems, devices, and units described above can refer to the corresponding processes in the foregoing method embodiments, and details are not described herein again.

In the embodiments provided in this application, it will be appreciated that the disclosed devices and methods may be implemented in other ways. For example, the device embodiments described above are only schematic. For example, the division of the units is only a division of logical functions. In an actual implementation, there may be other divisions, for example, multiple units or components may be combined or integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units described as separate components may or may not be physically separated, and the components displayed as units may or may not be physical units, that is, they may be located in one place, or may be distributed on multiple network units. Some or all of the units may be selected according to actual needs to achieve the object of the solutions of this embodiment.

In addition, the functional units in various embodiments of the present disclosure may be integrated into one processing unit, or each unit may exist alone physically, or two or more units may be integrated into one unit.

If the functions can be implemented in the form of software functional units and sold or used as an independent product, the product can be stored in a computer readable storage medium. Based on such an understanding, the essential part of the technical solution of the present disclosure or the part contributing to the related art or the part of the technical solution can be embodied in the form of a software product, the computer software product is stored in a storage medium, including several instructions to cause a computer device (which may be a personal computer, a server, or a network equipment, etc.) to perform all or part of the steps of the methods described in the embodiments of the present disclosure. The foregoing storage media include various a medium that can store program codes, such as a USB disk, a mobile hard disk, a ROM, a RAM, a magnetic disk, or an optical disk, etc.

In addition, it should be noted that, in the devices and methods of the present disclosure, obviously, the components or steps can be decomposed and/or recombined. These decompositions and/or recombinations should be regarded as equivalent solutions of the present disclosure. In addition, the steps for performing the above series of processing may naturally be executed in chronological order in the order described, but they do not necessarily need to be executed in chronological order, and some steps may be executed in parallel or independently of each other. Those of ordinary skill in the art can understand that all or any steps or components of the methods and devices of the present disclosure can be implemented in hardware, firmware or a combination thereof in any computing device (including a processor, a storage medium, etc.) or a network of computing devices, which can be realized by those of ordinary skill in the art using their basic programming skills after reading the description of the present disclosure.

Therefore, the object of the present disclosure can also be achieved by running a program or a group of programs on any computing device. The computing device may be a well-known general-purpose device. Therefore, the object of the present disclosure can also be achieved only by providing a program product containing program codes for implementing the methods or devices. That is, such a program product also constitutes the present disclosure, and a storage medium storing such a program product also constitutes the present disclosure. Obviously, the storage medium may be any known storage medium or any storage medium developed in the future. It should also be noted that, in the devices and methods of the present disclosure, obviously, the components or steps can be decomposed and/or recombined. These decompositions and/or recombinations should be regarded as equivalent solutions of the present disclosure. In addition, the steps for performing the above series of processing may naturally be executed in chronological order in the order described, but they do not necessarily need to be executed in chronological order. Certain steps can be performed in parallel or independently of each other.

The above are optional embodiments of the present disclosure. It should be noted that, for those of ordinary skill in the art, a number of improvements and modifications can be made without departing from the principles described in the present disclosure. These improvements and modifications are also within the protection scope of the present disclosure.

What is claimed is:

1. A downlink control information (DCI) transmission method applied to a network equipment, comprising:
   determining a DCI format for transmitting the downlink control information (DCI), the DCI format comprising: a time domain resource allocation field, a first indication field or a second indication field, the first indication field indicating a configuration value of a time domain resource and a configuration value of a modulation order, the second indication field indicating a configuration value of a time domain resource and a configuration value of an aggregate transmission indication; and
   transmitting the DCI according to the DCI format;
   wherein the time domain resource allocation field is used to indicate a configuration value of a first type;
   the configuration value of the first type is one of L1 types of configuration values, and the L1 types of configuration values are L1 types of configurations from all or part of configurations of the time domain resource;
   wherein the configuration value of the first type comprises a time domain symbol length occupied by a physical downlink shared channel (PDSCH) and an offset value, the offset value represents an offset of the PDSCH relative to a start OFDM symbol or end OFDM symbol of a control resource set; L1 is a configured value.

2. The DCI transmission method according to claim 1, wherein,
   the configuration value of the time domain resource indicated by the first indication field comprises: a number of OFDM symbols indicated by a time domain resource field;
   the configuration value of the modulation order indicated by the first indication field comprises: the modulation order determined according to the number of the OFDM symbols indicated by the time domain resource field.

3. The DCI transmission method according to claim 2, wherein,
   when K≤n≤N, the modulation order determined according to the number of the OFDM symbols is a first type of coding mode, the number of the OFDM symbols is indicated by the time domain resource field, where n is the number of the OFDM symbols indicated by the time domain resource allocation field, N≥K, and N, K are configured values or pre-configured fixed values.

4. The DCI transmission method according to claim 2, wherein,
   when N<n≤K, the modulation order determined according to the number of the OFDM symbols is a second type of coding mode, the number of the OFDM symbols is indicated by the time domain resource field, where n is the number of the OFDM symbols indicated by the time domain resource allocation field, M≥N, and N, M are configured values or pre-configured fixed values.

5. The DCI transmission method according to claim 2, wherein,
   when n>M, the modulation order determined according to the number of the OFDM symbols is a third type of coding mode, the number of the OFDM symbols is indicated by the time domain resource field, where n is the number of the OFDM symbols indicated by the time domain resource allocation field, and M is a configured value or pre-configured fixed value.

6. The DCI transmission method according to claim 2, wherein,
   when n=L, the modulation order determined according to the number of the OFDM symbols is a fourth type of coding mode, the number of the OFDM symbols is indicated by the time domain resource field, where n is the number of the OFDM symbols indicated by the time domain resource allocation field, and L is a configured value or pre-configured fixed value.

7. The DCI transmission method according to claim 2, wherein the DCI further comprises at least one of: a flag field, a frequency resource allocation field, a hybrid automatic repeat request (HARM) process number indication field, a redundancy version field, a transmission block size indication field, and cyclic redundancy check field.

8. The DCI transmission method according to claim 1, wherein the aggregation transmission indication field is used to indicate a configuration value of a second type;
   the configuration value of the second type is one of L2 types of configuration values, and the L2 types of configuration values are L2 types of configurations from all or part of configurations of the aggregation transmission indication field;
   wherein the configuration value of the second type comprises an aggregation level and an interval, the interval is an interval between aggregation transmissions; L2 is a configured value.

9. The DCI transmission method according to claim 1, wherein the configuration value of the time domain resource and the configuration value of the aggregation transmission indication indicated by the second indication field comprise a configuration value of a third type;
   the configuration value of the third type is one of L3 types of configuration values, and the L3 types of configuration values are L3 types of configurations from all or part of configurations of the time domain resource field and the aggregation transmission indication field;
   wherein the configuration value of the third type comprises a time domain symbol length occupied by a physical downlink sharing channel, an offset value, an aggregation level, and an interval between aggregation transmissions; L3 is a configured value.

10. The DCI transmission method according to claim 1, wherein the DCI further comprises at least one of: a DCI format identifier field, a frequency domain resource allocation field, a virtual resource block (VRB)-to-physical resource block (PRB) mapping field, a modulation and coding scheme field, a new data indication field, a redundancy version field, a hybrid automatic repeat request (HARD) process number indication field, a downlink allocation index indication field, a physical uplink control channel (PUCCH) transmission power control (TPC) indication field, a PUCCH resource indication field, a physical downlink sharing channel (PDSCH)-to-HARQ feedback time indication field, and a cyclic redundancy check field.

11. A network equipment, comprising:
a processor configured to determine a DCI format for transmitting the downlink control information (DCI), the DCI format comprising: a time domain resource allocation field, a first indication field or a second indication field, the first indication field indicating a configuration value of a time domain resource and a configuration value of a modulation order, the second indication field indicating a configuration value of a time domain resource and a configuration value of an aggregate transmission indication; and
a transceiver configured to transmit the DCI according to the DCI format;
wherein the time domain resource allocation field is used to indicate a configuration value of a first type;
the configuration value of the first type is one of L1 types of configuration values, and the L1 types of configuration values are L1 types of configurations from all or part of configurations of the time domain resource;
wherein the configuration value of the first type comprises a time domain symbol length occupied by a physical downlink shared channel (PDSCH) and an offset value, the offset value represents an offset of the PDSCH relative to a start OFDM symbol or end OFDM symbol of a control resource set; L1 is a configured value.

12. The network equipment according to claim 11, wherein,
the configuration value of the time domain resource indicated by the first indication field comprises: a number of OFDM symbols indicated by a time domain resource field;
the configuration value of the modulation order indicated by the first indication field comprises: the modulation order determined according to the number of the OFDM symbols indicated by the time domain resource field.

13. The network equipment according to claim 12, wherein,
when K≤n≤N, the modulation order determined according to the number of the OFDM symbols is a first type of coding mode, the number of the OFDM symbols is indicated by the time domain resource field, where n is the number of the OFDM symbols indicated by the time domain resource allocation field, N≥K, and N, K are configured values or pre-configured fixed values; or
when N<n≤K, the modulation order determined according to the number of the OFDM symbols is a second type of coding mode, the number of the OFDM symbols is indicated by the time domain resource field, where n is the number of the OFDM symbols indicated by the time domain resource allocation field, M≥N, and N, M are configured values or pre-configured fixed values.

14. The network equipment according to claim 12, wherein,
when n>M, the modulation order determined according to the number of the OFDM symbols is a third type of coding mode, the number of the OFDM symbols is indicated by the time domain resource field, where n is the number of the OFDM symbols indicated by the time domain resource allocation field, and M is a configured value or pre-configured fixed value; or
when n=L, the modulation order determined according to the number of the OFDM symbols is a fourth type of coding mode, the number of the OFDM symbols is indicated by the time domain resource field, where n is the number of the OFDM symbols indicated by the time domain resource allocation field, and L is a configured value or pre-configured fixed value.

15. The network equipment according to claim 12, wherein the DCI further comprises at least one of: a flag field, a frequency resource allocation field, a hybrid automatic repeat request (HARM) process number indication field, a redundancy version field, a transmission block size indication field, and cyclic redundancy check field.

16. The network equipment according to claim 11, wherein the aggregation transmission indication field is used to indicate a configuration value of a second type;
the configuration value of the second type is one of L2 types of configuration values, and the L2 types of configuration values are L2 types of configurations from all or part of configurations of the aggregation transmission indication field;
wherein the configuration value of the second type comprises an aggregation level and an interval, the interval is an interval between aggregation transmissions; L2 is a configured value.

17. The network equipment according to claim 11, wherein the configuration value of the time domain resource and the configuration value of the aggregation transmission indication indicated by the second indication field comprise a configuration value of a third type;
the configuration value of the third type is one of L3 types of configuration values, and the L3 types of configuration values are L3 types of configurations from all or part of configurations of the time domain resource field and the aggregation transmission indication field;
wherein the configuration value of the third type comprises a time domain symbol length occupied by a physical downlink sharing channel, an offset value, an aggregation level, and an interval between aggregation transmissions; L3 is a configured value.

18. The network equipment according to claim 11, wherein the DCI further comprises at least one of: a DCI format identifier field, a frequency domain resource allocation field, a virtual resource block (VRB)-to-physical resource block (PRB) mapping field, a modulation and coding scheme field, a new data indication field, a redundancy version field, a hybrid automatic repeat request (HARD) process number indication field, a downlink allocation index indication field, a physical uplink control channel (PUCCH) transmission power control (TPC) indication field, a PUCCH resource indication field, a physical downlink sharing channel (PDSCH)-to-HARQ feedback time indication field, and a cyclic redundancy check field.

* * * * *